W. C. ARSEM.
REDUCTION OF OXIDS.
APPLICATION FILED JAN. 6, 1909.
1,023,290.
Patented Apr. 16, 1912.
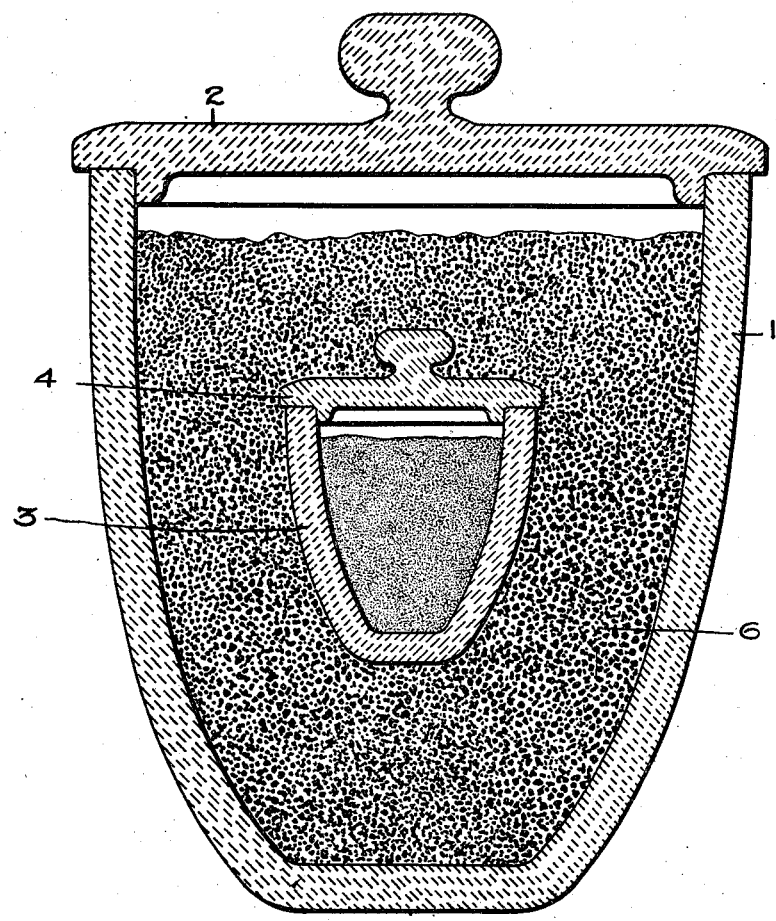
Witnesses:
Marcus L. Byng.
Earl G. Klock.
Inventor:
William C. Arsem,
by Albert H. Davis
Att'y.

UNITED STATES PATENT OFFICE.

WILLIAM C. ARSEM, OF SCHENECTADY, NEW YORK, ASSIGNOR TO GENERAL ELECTRIC COMPANY, A CORPORATION OF NEW YORK.

REDUCTION OF OXIDS.

1,023,290. Specification of Letters Patent. Patented Apr. 16, 1912.

Application filed January 6, 1909. Serial No. 470,918.

*To all whom it may concern:*

Be it known that I, WILLIAM C. ARSEM, a citizen of the United States, residing at Schenectady, county of Schenectady, State of New York, have invented certain new and useful Improvements in Reduction of Oxids, of which the following is a specification.

My present invention comprises a process for the production of an oxid of a metal from a higher oxid of that metal.

The process is applicable generally to metals which form more than one oxid and is of particular value for the preparation of the lower oxids of such metals as tungsten, molybdenum, vanadium, uranium and titanium.

As one embodiment of my invention I will hereinafter describe it as applied to the production of the brown oxid of tungsten, this being of the chemical composition $WO_2$ and obtained by reduction of the yellow oxid $WO_3$. Carbon monoxid is used by me as the reducing agent and the details of procedure are hereinafter set forth.

An apparatus in which my process can be conveniently carried out is shown in the accompanying drawing, and comprises an outer clay crucible 1 provided with a cover 2 and inclosing a smaller graphite or clay crucible 3 having a cover 4. The $WO_3$ to be reduced is placed in the inner or graphite or clay crucible and the latter is entirely inclosed by a carbon packing 6. The crucibles are then placed in an electric muffle furnace or in a suitable gas furnace and heated up to about 800° C. The air initially present in the carbon packing and in the $WO_3$ powder produces CO by action on the carbon packing and this CO reduces a part of the $WO_3$ to $WO_2$, thus:—

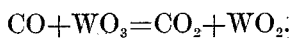

This $CO_2$, by diffusion, comes in contact with the carbon packing and reaction takes place, thus:—

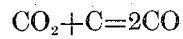

thereby reforming CO which again diffuses into the remaining $WO_3$ and continues the reduction. The porosity of the inner graphite crucible materially favors rapid diffusion of these gases, which diffusion is, of course, very rapid at high temperatures, with the result that an atmosphere rich in CO is constantly in contact with the $WO_3$ and quickly reduces it entirely to $WO_2$. The low temperature of treatment and the entire absence of contact between the carbon and the tungstic acid insure absence of tungsten carbid or free carbon in the resultant product. The $WO_2$ thus prepared is a very suitable material for use in the production of lamp filaments. It may be used either as the basis for the squirting mixture, or as the material from which the metal itself is obtained before shaping into threads.

As above indicated, the method is equally applicable to the oxids of molybdenum and other metals, thus affording an easy means of obtaining low oxids, some of which have heretofore been almost unattainable except in an impure state.

What I claim as new and desire to secure by Letters Patent of the United States, is,—

1. The method of producing a low oxid of a metal which consists in introducing the higher oxid into a pervious receptacle, creating a heated atmosphere of carbon monoxid around the receptacle, and thereby reducing the higher oxid by diffusion of the carbon monoxid into the receptacle.

2. The method of producing a low oxid of a metal, which consists in introducing the higher oxid into a pervious receptacle, packing said receptacle in carbon, and heating to cause diffusion of carbon monoxid into the receptacle.

3. The method which consists in placing tungstic acid in a pervious receptacle, packing the receptacle in carbon, and heating to cause reduction of the tungstic acid by carbon monoxid diffusing into said receptacle.

4. The method of reducing an oxid which consists in heating it with a reducing agent separated from it by a pervious wall to cause gas to diffuse back and forth through the wall to reduce the oxid and be in turn reduced by said reducing agent.

5. The method of producing chemical changes between two substances which consists in heating them in proximity to one another with an intervening pervious wall to cause diffusion of gas reacting with them back and forth through said wall.

In witness whereof, I have hereunto set my hand this 5th day of January, 1909.

WILLIAM C. ARSEM.

Witnesses:
HELEN ORFORD,
BENJAMIN B. HULL.

Copies of this patent may be obtained for five cents each, by addressing the "Commissioner of Patents, Washington, D. C."